United States Patent
Ando

(10) Patent No.: US 12,283,408 B2
(45) Date of Patent: *Apr. 22, 2025

(54) THICK FILM RESISTOR PASTE, THICK FILM RESISTOR, AND ELECTRONIC COMPONENT

(71) Applicant: SUMITOMO METAL MINING CO., LTD., Tokyo (JP)

(72) Inventor: Masaki Ando, Ome (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 301 days.

This patent is subject to a terminal disclaimer.

(21) Appl. No.: 17/922,110

(22) PCT Filed: Apr. 30, 2021

(86) PCT No.: PCT/JP2021/017299
§ 371 (c)(1),
(2) Date: Oct. 28, 2022

(87) PCT Pub. No.: WO2021/221173
PCT Pub. Date: Nov. 4, 2021

(65) Prior Publication Data
US 2023/0170114 A1  Jun. 1, 2023

(30) Foreign Application Priority Data

May 1, 2020  (JP) ................. 2020-081114

(51) Int. Cl.
H01C 17/065  (2006.01)
H01C 7/00  (2006.01)

(52) U.S. Cl.
CPC ......... *H01C 17/0654* (2013.01); *H01C 7/003* (2013.01)

(58) Field of Classification Search
CPC .............. H01C 7/003; H01C 17/06533; H01C 17/06534
See application file for complete search history.

(56) References Cited

U.S. PATENT DOCUMENTS

| | | | | |
|---|---|---|---|---|
| 5,379,016 A | * | 1/1995 | Smith | H01C 17/242 338/195 |
| 8,815,125 B2 | * | 8/2014 | Ogata | H01B 1/22 428/209 |
| 10,115,505 B2 | * | 10/2018 | Murakami | H01C 1/012 |
| 12,024,466 B2 | * | 7/2024 | Ando | C03C 8/16 |

FOREIGN PATENT DOCUMENTS

| | | |
|---|---|---|
| JP | 52-54195 A | 5/1977 |
| JP | 53-100496 A | 9/1978 |
| JP | 4-320003 A | 11/1992 |
| JP | 6-163202 A | 6/1994 |

OTHER PUBLICATIONS

International Search Report dated Jul. 6, 2021, issued in counterpart International Application No. PCT/JP2021/017299 (2 pages).

* cited by examiner

*Primary Examiner* — Kyung S Lee
(74) *Attorney, Agent, or Firm* — WHDA, LLP

(57) ABSTRACT

To provide a thick film resistor paste for a resistor having a smaller resistance change rate and excellent surge resistance, a thick film resistor using the thick film resistor paste, and an electronic component provided with the thick film resistor. A thick film resistor paste comprises a lead-ruthenate-containing glass powder and an organic vehicle, the lead-ruthenate-containing glass powder comprises 10 to 70 mass % of lead ruthenate, a glass composition of the lead-ruthenate-containing glass powder comprises 3 to 30 mass % of silicon oxide, 30 to 90 mass % of lead oxide. 5 to 50 mass % of boron oxide relative to 100 mass % of glass components, and, a combined amount of silicon oxide, lead oxide and boron oxide by mass % is 50 mass % or more relative to 100 mass % of the glass components.

4 Claims, No Drawings

THICK FILM RESISTOR PASTE, THICK FILM RESISTOR, AND ELECTRONIC COMPONENT

TECHNICAL FIELD

The present invention relates to a thick film resistor paste, and more particularly to a thick film resistor paste containing a glass powder containing lead ruthenate as a conductive substance and capable of forming a thick film resistor particularly with excellent surge resistance, a thick film resistor using such thick film resistor paste, and an electronic component with such thick film resistor.

BACKGROUND ART

A thick film resistor paste is generally comprised of a conductive powder, a glass powder, and an organic vehicle for making them into a paste suitable for printing. By printing the thick film resistor paste in an arbitrary pattern and sintering a glass at a high temperature of usually 800 to 1000 degrees Celsius, the thick film resistor paste is used as a thick film resistor for electronic components such as thick film chip resistors. As the conductive powders, ruthenium oxide powders and lead ruthenate powders are widely used because the resistance can be gradually changed by adjusting the mixing ratio with the glass powders.

For example, Patent Document 1 describes a technique of a thick film resistor formed using a resistor paste, made by adding a mixture using mullite as an inorganic particle, lead borosilicate glass as a glass particle, and ruthenium dioxide as a conductive particle, to a vehicle using ethyl cellulose as a binder and toluene and alcohol as a solvent.

Patent Document 2 describes a technique of a resistor paste and a thick film resistor formed using the resistor paste, obtained by adding a mixture using zircon as an inorganic particle, lead borosilicate glass as a glass particle, and ruthenium dioxide as a conductive particle, with a vehicle using ethyl cellulose as a binder and terpineol and butyl carbitol acetate as a solvent.

In recent years, the miniaturization of electronic components such as thick film chip resistors have progressed, and thick film resistors are required to have improved electrical characteristics. In particular, thick film resistors with excellent voltage resistance such as surge resistance are required. When an instantaneous high voltage (surge voltage) is applied to a thick film resistor, it usually shows a negative resistance change, but the smaller amount of change in the resistance value is desirable. Such negative resistance change is considered to be an effect of heat generation when a voltage is applied. In conventional thick film resistor pastes, glass powders are bonded to each other during sintering, but softening of the glass powders is limited only to the surface layer. Therefore, a dielectric layer corresponding to the glass particle diameter exists in the thick film resistor after the thick film resistor paste is sintered. The conductive powder, distributed around the dielectric layer, makes the thick film resistor conductive. It is considered that when a surge voltage is applied to such a structure, an electric current flows in the conductive area, the surrounding area is locally heated, and the resistance value changes.

A method of improving the surge resistance of a thick film resistor is to increase the amount of lead ruthenate contained in the thick film resistor paste. Increasing the amount of lead ruthenate contained in the thick film resistor paste is thought to be capable of forming a thicker and stronger conductive area with thicker conductive paths in the thick film resistor after sintering the thick film resistor paste, suppressing heat generation when surge voltage is applied and mitigating the effect of resistance value change.

However, increasing the amount of lead ruthenate leads to an increase in the temperature coefficient of resistance (TCR). TCR shows the rate of change in resistance per unit temperature and is one of important characteristics of thick film resistors. When the TCR is increased by increasing the amount of lead ruthenate, the resistance of the conductive area itself changes even if the resistance change due to heat generation during the application of surge voltage is suppressed.

Therefore, when increasing the amount of lead ruthenate, the TCR is required to be brought close to zero. The TCR can be adjusted by adding additives mainly comprising of metal oxides to the thick film resistor. The metal oxides include manganese oxides, niobium oxides, and titanium oxides. However, since the range of adjustment by the additives is limited, and an amount of lead ruthenate to be increase is also limited.

Another method for improving the surge resistance of a thick film resistor has attempted to make the distribution of conductive substances in thick film resistor more uniform. If the distribution of conductive substances becomes more uniform, the effect of localized heat generation can be mitigated by the uniform flow of electric current through the resistor during the application of surge voltage.

PRIOR ART DOCUMENTS

Patent Documents

Patent Document 1: JP Patent Laid-Open No. H04-320003
Patent Document 2: JP Patent Laid-Open No. H06-163202

SUMMARY OF THE INVENTION

Problems to be Solved by the Invention

However, thick film resistors for electronic components that have become smaller in size in recent years are required to have higher surge resistances.

The object of the present invention is to provide a thick film resistor paste for resistors having a smaller resistance change rate and an excellent surge resistance, a thick film resistor using such thick film resistor paste, and electronic components equipped with such thick film resistors, for electronic components that are becoming smaller in size.

Measures to Solve the Problems

As a result of various studies, a thick film resistor formed by a thick film resistor paste using a lead-ruthenate-containing glass with a specific composition is found to have better surge resistance than conventional products. And the present invention is derived.

That is, the thick film resistor paste according to the present invention comprises a lead-ruthenate-containing glass powder and an organic vehicle, wherein the lead-ruthenate-containing glass powder comprises 10 mass % or more and 70 mass % or less of lead ruthenate, wherein a glass composition of the lead-ruthenate-containing glass powder comprises 3 mass % or more and 60 mass % or less of silicon oxide, 30 mass % or more and 90 mass % or less of lead oxide, and 5 mass % or more and 50 mass % or less of boron oxide relative to 100 mass % of glass components, and wherein a combined amount of silicon oxide, lead oxide and boron oxide by mass % is 50 mass % or more relative to 100 mass % of the glass components.

Further, in the thick film resistor paste of the present invention, the average particle diameter of the lead-ruthenate-containing glass powder may preferably be 5 micrometers or less.

Further, the thick film resistor according to the present invention is characterized to comprise a sintered body of the thick film resistor paste of any embodiments of the above present invention.

Further, the electric or electronic component according to the present invention is characterized to comprise the thick film resistor of the above present invention.

Effect of the Invention

The present invention can provide a thick film resistor paste having a surge resistance higher than those of conventional ones, a thick film resistor using the thick film resistor paste, and an electric or electronic component provided with the thick film resistor.

MODE FOR CARRYING OUT THE INVENTION

Hereinafter, the embodiments of the present invention will be described. The present invention is not limited to the following embodiments, but various variations and substitutions can be made to the following embodiments within the scope of the present invention.

The thick film resistor paste of the present embodiment comprises a lead-ruthenate-containing glass powder and an organic vehicle. Hereinafter, each component of the thick film resistor paste will be described in detail.

(Conductive Substance)

For the thick film resistor paste of the present invention, lead ruthenate is used as a conductive substance. A general thick film resistor paste has a structure that contains a conductive substance and glass in respective powder form. In the thick film resistor paste of the present invention, however, the conductive substance made of lead ruthenate powder is not used alone. The thick film resistor paste of the present invention has a structure containing a lead-ruthenate-containing glass powder that is obtained by crushing a lead-ruthenate-containing glass produced by using the conductive substance made of lead ruthenate powder as a part of raw materials.

The particle diameter of lead ruthenate forming the lead-ruthenate-containing glass powder is not specifically limited, but a particle diameter that has a specific surface area of 5 m$^2$/g or more is preferably used. If the specific surface area is less than 5 m$^2$/g, the particle diameter of lead ruthenate becomes too large, and may reduce the uniformity of the conductive area in the thick film resistor and reduce the surge resistance.

(Glass Components)

The glass components used for the lead-ruthenate-containing glass in the thick film resistor paste of the present invention contain silicon oxide ($SiO_2$), lead oxide (PbO), and boron oxide ($B_2O_3$). In addition to those materials, magnesium oxide (MgO), calcium oxide (CaO), barium oxide (BaO), strontium oxide (SrO), cadmium oxide (CdO), tin oxide (SnO), zinc oxide (ZnO), bismuth oxide ($Bi_2O_3$) or the like may be included. Aluminum oxide ($Al_2O_3$) may also be included.

(Silicon Oxide: $SiO_2$)

$SiO_2$ is a base component of the glass components of the present invention, and the blending amount of $SiO_2$ is 3 mass % or more and 60 mass % or less relative to 100 mass % of the glass components contained in the lead-ruthenate-containing glass. If the blending amount of $SiO_2$ is more than 60 mass %, the softening point of the glass to be formed becomes too high. In addition, if the blending amount of $SiO_2$ is less than 3 mass %, chemically stable glass cannot be obtained.

(Lead Oxide: PbO)

PbO has a function of lowering the softening point, and a function of chemically stabilizing lead ruthenate and inhibiting its decomposition. The blending amount of PbO is 30 mass % or more and 90 mass % or less relative to 100 mass % of the glass components contained in the lead-ruthenate-containing glass. If the blending amount of PbO is less than 30 mass %, the softening point of the glass to be formed becomes too high. In addition, if the blending amount of PbO is more than 90 mass %, it becomes difficult to obtain a chemically stable glass state.

(Boron Oxide: $B_2O_3$)

$B_2O_3$ is a base component of the glass components of the present invention, as well as $SiO_2$. And $B_2O_3$ has an effect of lowering the softening point of the glass to be formed. The blending amount of $B_2O_3$ is 5 mass % or more and 50 mass % or less relative to 100 mass % of the glass components contained in the lead-ruthenate-containing glass. If the blending amount of $B_2O_3$ is less than 5 mass %, the toughness of the glass to be formed is reduced, cracks are likely to be generated, and the laser trimming property is reduced. In addition, if the blending amount of $B_2O_3$ is more than 50 mass %, the phase separation of the glass components is likely to occur, and the water resistance is also reduced.

(Combined Amount of Essential Glass Components)

The combined amount of $SiO_2$, PbO, and $B_2O_3$ by mass % is 50 mass % or more relative to 100 mass % of the glass components contained in the lead-ruthenate-containing glass. If the combined amount is less than 50 mass %, it is difficult to form the glass stably, and it becomes difficult to meet the surge resistance requirements of the electrical characteristics of the thick film resistor of the present invention.

(Other Glass Components)

In addition to the above essential glass components, oxides can be further added as glass components to improve various properties to the extent that they do not deteriorate the properties of conductive substance-containing glass. Specifically, $Al_2O_3$, MgO, CaO, BaO, SrO, CdO, SnO, ZnO, $Bi_2O_3$ or the like can be contained. Each of the blending amount of these glass components is 20 mass % or less relative to 100 mass % of the glass components contained in the lead-ruthenate-containing glass.

(Lead-Ruthenate-Containing Glass)

In the lead-ruthenate-containing glass used for the thick film resistor paste of the present invention, the blending ratios of the lead ruthenate as the conductive substance and the glass components are, relative to 100 mass % of the lead-ruthenate-containing glass composition, 10 mass % or more and 70 mass % or less of the lead ruthenate, and 30 mass % or more and 90 mass % or less of the glass components. If the content of the lead ruthenate is less than 10 mass %, the resistance of the produced lead-ruthenate-containing glass powder becomes too high and it shows almost no conductivity. In addition, if the blending ratio of the lead ruthenate is more than 70 mass %, the glass components cannot cover the lead ruthenate powder, and the lead-ruthenate-containing glass becomes brittle. By adjusting the blending ratios of the lead ruthenate and the glass components, the resistance value of the thick film resistor is adjustable to the vicinity of the target resistance value.

The lead-ruthenate-containing glass should be milled so that the average particle diameter is less than 5 micrometers. If the average particle diameter is larger than 5 micrometers, the uniformity of the thick film resistor may decrease and the effect of improving surge resistance may not be achieved. So the average particle diameter is preferably not more than 5 micrometers. Ball mills, planetary mills, bead mills or the like may be used for the milling method.

In the present invention, the average particle diameter means the median diameter, and it is a numerical value measured using the particle diameter distribution meter using pure water solvent (HPA9320-10 0X, manufactured by MICROTRAC™ Bell Inc.), wherein the powder to be measured is dispersed ultrasonically in 2 g/L of aqueous sodium hexametaphosphate solution.

(Other Additives)

For the purpose of adjusting and improving the resistance value, TCR, and other characteristics of the thick film resistor, the thick film resistor paste of the present invention may further comprise borosilicate glass that does not contain conductive substances, and may further comprise additives commonly used. Dispersants may also be included as additives to improve dispersibility. Major additives include niobium oxide ($Nb_2O_5$), tantalum oxide ($Ta_2O_5$), titanium oxide ($TiO_2$), copper oxide (CuO), manganese oxide ($MnO_2$), zirconium oxide ($ZrO_2$), aluminum oxide ($Al_2O_3$) and others. The content amount of additives can be adjusted according to the desired improvement characteristics, but it is preferable that the content amount is 10 mass % or less relative to 100 mass % of the total inorganic material amount.

(Organic Vehicle)

There are no restrictions on the organic vehicle used for the thick film resistor pastes of the present invention, and resins such as ethyl cellulose and rosin dissolved in a solvent such as turpineol, that are used for general resistor pastes, may be used. The blending amount of the organic vehicle may be adjusted according to the printing method or the like. But in general, the blending amount of the organic vehicle should be between 20 mass % or more and 50 mass % or less relative to 100 mass % of the total amount of resistor paste.

(Method of Preparing Thick Film Resistor Paste)

Not specific but common three-roll mills, bead mills or the like can be used for the method of preparing the thick film resistor paste, the method comprising mixing the lead-ruthenate-containing glass and the organic vehicle, and further adding as needed the lead borosilicate glass powder and the additives or the like.

(Method of Preparing Thick Film Resistor)

The thick film resistor can be obtained by printing the preliminarily obtained thick film resistor paste on a ceramic substrate, removing an organic solvent by drying, and then sintering at a temperature of, for example, 800 and 900 degrees Celsius.

EMBODIED EXAMPLES

Hereinafter, the present invention will be explained more detail with reference to embodied examples, but the present invention is not limited to these examples.

Embodied Example 1: Evaluation of Resistor Having Area Resistance Value 10 Kiloohm The lead-ruthenate-containing glass was prepared by mixing at a ratio of 63 mass % of a glass material and 37 mass % of lead ruthenate, melting and then cooling the mixture. The glass composition of the prepared lead-ruthenate-containing glass was 33 mass % of $SiO_2$, 46 mass % of PbO, 5 mass % of $Al_2O_3$, 7 mass % of $B_2O_2$, 3 mass % of ZnO, and 6 mass % of CaO, relative to 100 mass % of glass components.

The obtained lead-ruthenate-containing glass was pulverized with a ball mill so that the average particle diameter was about 1 micrometer. The thick film resistor paste of Embodied Example 1 was prepared by mixing the following thick film resistor composition in a three-roll mill so that the various inorganic materials were dispersed in the organic vehicle. The thick film resistor composition contained 59 mass % of the lead-ruthenate-containing glass powder, 1 mass % of $Nb_2O_5$ as an additive and the rest was comprised of the organic vehicle. For the organic vehicle, 20 mass parts of ethyl cellulose dissolved relative to 100 mass parts of turpineol was used. The composition of the thick film resistor paste of Embodied Example 1 and the composition of the lead-ruthenate-containing glass used to produce the thick film resistor paste are shown in Table 1.

<Evaluation Test>

(Preparing of the Samples for Evaluation)

The prepared thick film resistor paste was printed at a width of 1.0 mm between five pairs of electrodes at an interval of 1.0 mm spacing, the electrodes being preliminarily formed on an alumina substrate, and dried in a belt furnace at a peak temperature of 150 degrees Celsius for five minutes. Then, the thick film resistor paste was sintered in a belt furnace at a peak temperature of 850 degrees Celsius for nine minutes. Five similarly processed samples were made in each of five units of alumina substrates to obtain 25 thick film resistors as evaluation samples.

(Film Thickness Measurement)

Regarding film thickness, after selecting an arbitrary alumina substrate unit among the evaluation samples, a stylus-type surface roughness meter was used to measure the film thicknesses of each of the five thick film resistors, and an average value of the measured film thicknesses at the five points was used as an actual measured film thickness.

(Converted Area Resistance)

Resistance values of 25 evaluation samples formed on five alumina substrates at 25 degrees Celsius, were measured with a circuit meter (2001 MULTIMETER, KEITHLEY™ Inc.), and the average value was used as the actual measured resistance. The following equation (1) was used to calculate the converted area resistance when the film thickness was 7 micrometers. The calculated converted area resistance is shown in Table 3.

$$\text{Converted area resistance(kiloohm)} = \text{Measured resistance(kiloohm)} \times \text{(Measured film thickness(micrometer)/7(micrometer))} \quad (1)$$

(Temperature Coefficient of High Temperature Resistance: High Temperature TCR)

The resistance values of the five thick film resistors of the evaluation samples formed on one alumina substrate, were measured while holding in thermostatic chambers at 25 degrees Celsius and at 125 degrees Celsius for 30 minutes, respectively. The measured resistance values were set to $R_{25}$ and $R_{125}$, respectively. A high temperature TCR was calculated using the following equation (2). The calculated average value of high temperature TCRs of the five points is shown in Table 3.

$$\text{High temperature TCR(ppm/degrees Celsius)} = [(R_{125} - R_{25})/R_{25}]/(100) \times 10^6 \quad (2)$$

(Evaluation of Trimming Property)

A glass paste was prepared by kneading with a three-roll mill so as to disperse a glass material containing 30 mass % of $SiO_2$, 55 mass % of PbO, 5 mass % of $Al_2O_3$, and 10 mass % of $B_2O_3$, in an organic vehicle of the same composition as that used in Embodied Example 1. The glass paste was applied to cover the thick film resistor of the evaluation sample and dried in a belt furnace at a peak temperature of 150 degrees Celsius for five minutes. The glass material was then sintered in a belt furnace at a peak temperature of 600 degrees Celsius for five minutes. The resistance value of the thick film resistor coated with the glass paste was set as the initial resistance value Rs(t), and then laser trimmed with a laser trimming device (SL432R, OMRON™ Laserfront, Inc.) so as to achieve a resistance value 1.5 times that of Rs (t). Laser trimming conditions were as follows: straight cut, cutting speed 100 mm/sec, laser intensity 2 W, and Q-rate of 6 kHz. The resistance value after trimming was set as Re (t), and the percentage of resistance value deviation before and after trimming was calculated using the following equation (3).

$$\text{Resistance value deviation}(\%) = (Re(t) - 1.5 \times Rs(t))/Rs(t) \times 100 \quad (3)$$

If the resistance value deviation of any one of the five thick film resistors was 1% or more, the evaluation of trimming property was set to "X", and if all the resistance value deviations were less than 1%, the evaluation was set to "O". The evaluation results are shown in Table 3.

(Evaluation of Surge Resistance: Resistance Value Change Rate)

If the evaluation of trimming property was "O", an electrostatic discharge test was conducted on the thick film resistor of the evaluation sample by applying a voltage under the condition of an electric capacity of 200 pF and an internal resistance of zero ohm, using a semiconductor device electrostatic tester (ESS-6008, NOISE RESEARCH™ Labs). A voltage of 5 kV was applied to the thick film resistor of the evaluation sample five times at one-second intervals, and the resistance value before the voltage application Rs and the resistance value after the voltage application Re were measured. Resistance value change rates were calculated using the following equation (4). The calculated average value of the resistance value change rates at five points is shown in Table 3.

$$\text{Resistance value change rate } (\%) = (Re - Rs)/Rs \times 100 \quad (4)$$

Embodied Examples 2-12

Glass materials and lead ruthenate were mixed and melted in the proportions shown in Table 1, respectively, and then cooled to produce a lead-ruthenate-containing glass. The glass compositions of each of the prepared lead-ruthenate-containing glasses comprise $SiO_2$, PbO, $Al_2O_3$, $B_2O_3$, ZnO, and CaO, wherein the proportions of each content relative to 100 mass % of the glass components are shown in Table 1. Each of the obtained lead-ruthenate-containing glasses was pulverized with a ball mill to obtain the average particle diameter shown in Table 1. Each of the thick film resistor pastes of Embodied Examples 2 to 12 was prepared by mixing the thick film resistor composition that contained the lead-ruthenate-containing glass powder, the additives, and the organic vehicle in the proportions shown in Table 1, in a three-roll mill so that the various inorganic materials were dispersed in the organic vehicle. Each of the organic vehicles used in Embodied Examples 2 to 12 was the same composition as used in Embodied Example 1.

Thick film resistors of the evaluation samples were also prepared in the same manner as in Embodied Example 1, and evaluated in the same manner as in Embodied Example 1. The results of each evaluation are shown in Table 3.

Comparative Example 1

A thick film resistor paste was prepared by the conventional manufacturing method in which lead ruthenate as a conductive substance and glass were added in respective powder form, without using a lead-ruthenate-containing glass. However, if a lead ruthenate powder and a glass powder were respectively added without using a lead-ruthenate-containing glass powder that was obtained by grinding the lead-ruthenate-containing glass, differences in electrical characteristics (TCR) or the like were occurred, in adjusting the resistance value suitable for the thick film resistor paste. Therefore, in Comparative Example 1 prepared by the conventional manufacturing method, to adjust TCR or the like, a ruthenium oxide powder in addition to the lead ruthenate powder was added as the conductive substance, and combination amounts of the mixture were adjusted. Namely, the thick film resistor composition comprising 6 mass % of ruthenium oxide powder, 17 mass % of lead ruthenate powder, 36 mass % of glass powder, 1 mass % of $Nb_2O_5$ as an additive and the rest comprising organic vehicle were mixed to make the thick film resistor paste of Comparative Example 1 in a three-roll mill so that the various inorganic materials were dispersed in the organic vehicle. The glass composition in the prepared thick film resistor paste was, 33 mass % of $SiO_2$, 47 mass % of PbO, 5 mass % of $Al_2O_3$, 7 mass % of $B_2O_3$, 3 mass % of ZnO, and 5 mass % of CaO, relative to 100 mass % of the glass components. The organic vehicle used in Comparative Example 1 was the same composition as used in Embodied Example 1. The composition of the thick film resistor paste in Comparative Example 1 and the composition of the glass used to manufacture the thick film resistor paste are shown in Table 2.

Thick film resistors of the evaluation samples were also prepared in the same manner as in Embodied Example 1, and evaluated in the same manner as in Embodied Example 1. The results of each evaluation are shown in Table 3.

Comparative Example 2

A lead-ruthenate-containing glass was manufactured by mixing at a ratio of 77 mass % of glass, and 23 mass % of lead ruthenate, melting and then cooling the mixture. The glass composition of the prepared conductive substance-containing glass was 30 mass % of $SiO_2$, 65 mass % of PbO, 2 mass % of $Al_2O_3$, and 3 mass % of $B_2O_3$, relative to 100 mass % of the glass components.

The obtained lead-ruthenate-containing glass was pulverized with a ball mill so that the average particle diameter was about 1 micrometer. The thick film resistor paste of Comparative Example 2 was prepared by mixing the thick film resistor composition that contained 73 mass % of lead-ruthenate-containing glass powder, 1 mass % of $Mn_2O_3$ as an additive and the rest comprising organic vehicle, in a three-roll mill so that the various inorganic materials were dispersed in the organic vehicle. The organic vehicle used in Comparative Example 2 was the same composition as used in Embodied Example 1.

Thick film resistors of the evaluation samples were also prepared in the same manner as in Embodied Example 1, and evaluated in the same manner as in Embodied Example 1. The results of each evaluation are shown in Table 3.

Comparative Examples 3-10

Glass materials and lead ruthenate were mixed and melted in the proportions shown in Table 1, respectively, and then cooled to produce lead-ruthenate-containing glass. The glass compositions of each of the prepared lead-ruthenate-containing glasses comprise $SiO_2$, PbO, $Al_2O_3$, $B_2O_3$, ZnO, and CaO, wherein the proportions of each content relative to 100 mass % of the glass components are shown in Table 1.

Each of the obtained lead-ruthenate-containing glasses was pulverized with a ball mill so as to obtain the average particle diameter shown in Table 1. Each of the thick film resistor pastes of Comparative Examples 3 to 10 was prepared by mixing the thick film resistor composition that contained the lead-ruthenate-containing glass powder, the additives, and the organic vehicle in the proportions shown in Table 1, in a three-roll mill so that the various inorganic materials were dispersed in the organic vehicle. Each of the organic vehicles used in Comparative Examples 3 to 10 was the same composition as used in Embodied Example 1.

Thick film resistors of the evaluation samples were also prepared in the same manner as in Embodied Example 1, and evaluated in the same manner as in Embodied Example 1. The results of each evaluation are shown in Table 3.

TABLE 1

| Embodied Examples and Comparative Examples | Composition of thick film resistor paste | | | | Composition of lead-ruthenate-containing glass | | |
|---|---|---|---|---|---|---|---|
| | Content amount of lead-ruthenate-containing glass powder (wt %) | Content amount of organic vehicle (wt %) | Other additives | | Lead ruthenate | Glass components Essential glass components | |
| | | | Content amount of niobium oxide (wt %) | Content amount of manganese oxide (wt %) | Content amount of lead ruthenate (wt %) | Content amount of silicon oxide (wt %) | Content amount of lead oxide (wt %) |
| Embodied Example1 | 59 | 40 | 1 | — | 37 | 33 | 46 |
| Embodied Example2 | 59 | 40 | 1 | — | 10 | 33 | 46 |
| Embodied Example3 | 59 | 40 | 1 | — | 70 | 33 | 46 |
| Embodied Example4 | 59 | 40 | 1 | — | 37 | 3 | 66.6 |
| Embodied Example5 | 59 | 40 | 1 | — | 37 | 60 | 30 |
| Embodied Example6 | 59 | 40 | 1 | — | 37 | 42.8 | 30 |
| Embodied Example7 | 59 | 40 | 1 | — | 37 | 4 | 90 |
| Embodied Example8 | 59 | 40 | 1 | — | 37 | 33.7 | 47 |
| Embodied Example9 | 59 | 40 | 1 | — | 37 | 17.7 | 30 |
| Embodied Example10 | 59 | 40 | 1 | — | 37 | 15 | 30 |
| Embodied Example11 | 59 | 40 | 1 | — | 37 | 33 | 46 |
| Embodied Example12 | 59 | 40 | 1 | — | 37 | 33 | 46 |
| Comparative Example1 | — | 40 | 1 | — | — | — | — |
| Comparative Example2 | 73 | 26 | — | 1 | 23 | 30 | 65 |
| Comparative Example3 | 59 | 40 | 1 | — | 9 | 33 | 46 |
| Comparative Example4 | 59 | 40 | 1 | — | 75 | 33 | 46 |
| Comparative Example5 | 59 | 40 | 1 | — | 37 | 1 | 68 |
| Comparative Example6 | 59 | 40 | 1 | — | 37 | 70 | 20.6 |
| Comparative Example7 | 59 | 40 | 1 | — | 37 | 48.9 | 20 |
| Comparative Example8 | 59 | 40 | 1 | — | 37 | 3.1 | 95 |
| Comparative Example9 | 59 | 40 | 1 | — | 37 | 14.2 | 19.8 |
| Comparative Example10 | 59 | 40 | 1 | — | 37 | 15.3 | 21.4 |

TABLE 1-continued

| | Composition of lead-ruthenate-containing glass Glass components | | | | | Average particle diameter of the lead-ruthenate-containing glass powder (micrometer) |
|---|---|---|---|---|---|---|
| | Essential glass components | | Other glass components | | | |
| Embodied Examples and Comparative Examples | Content amount of boron oxide (wt %) | combined amount of these essential glass components (wt %) | Content amount of aluminium oxide (wt %) | Content amount of zinc oxide (wt %) | Content amount of calcium oxide (wt %) | |
| Embodied Example1 | 7 | 86 | 5 | 3 | 6 | 1 |
| Embodied Example2 | 7 | 86 | 5 | 3 | 6 | 1 |
| Embodied Example3 | 7 | 86 | 5 | 3 | 6 | 1 |
| Embodied Example4 | 10.1 | 79.7 | 7.3 | 4.3 | 8.7 | 1 |
| Embodied Example5 | 5 | 95 | 1.8 | 1.2 | 2 | 1 |
| Embodied Example6 | 9.1 | 81.9 | 6.5 | 3.8 | 7.8 | 1 |
| Embodied Example7 | 5 | 99 | 0.4 | 0.2 | 0.4 | 1 |
| Embodied Example8 | 5 | 85.7 | 5.1 | 3.1 | 6.1 | 1 |
| Embodied Example9 | 50 | 97.7 | 0.8 | 0.5 | 1 | 1 |
| Embodied Example10 | 5 | 50 | 17.9 | 12.1 | 20 | 1 |
| Embodied Example11 | 7 | 86 | 5 | 3 | 6 | 5 |
| Embodied Example12 | 7 | 86 | 5 | 3 | 6 | 6 |
| Comparative Example1 | — | — | — | — | — | — |
| Comparative Example2 | 3 | 98 | 2 | — | — | 1 |
| Comparative Example3 | 7 | 86 | 5 | 3 | 6 | 1 |
| Comparative Example4 | 7 | 86 | 5 | 3 | 6 | 1 |
| Comparative Example5 | 10.3 | 79.3 | 7.4 | 4.4 | 8.9 | 1 |
| Comparative Example6 | 3.1 | 93.7 | 2.3 | 1.3 | 2.7 | 1 |
| Comparative Example7 | 10.4 | 79.3 | 7.4 | 4.4 | 8.9 | 1 |
| Comparative Example8 | 0.6 | 98.7 | 0.5 | 0.2 | 0.6 | 1 |
| Comparative Example9 | 60 | 94 | 2.2 | 1.2 | 2.6 | 1 |
| Comparative Example10 | 3.3 | 40 | 21.4 | 12.9 | 25.7 | 1 |

*Each of the shown content amount (wt %) of lead-ruthenate-containing glass powder, organic vehicle, niobium oxide, and manganese oxide is relative to 100 wt % of the thick film resistor paste composition.
*The shown content amount (wt %) of lead ruthenate is relative to 100 wt % of the lead-ruthenate-containing glass composition.
*Each of the shown content amount (wt %) of silicon oxide, lead oxide, boron oxide, combined amount of these essential glass components, aluminum oxide, zinc oxide, and calcium oxide is relative to 100 wt % of the glass components.

TABLE 2

Composition of thick film resistor paste

| | Conductive substances | | | | Additives | Composition of glass | | | | | |
|---|---|---|---|---|---|---|---|---|---|---|---|
| | Content | Content | | | | | | | | | |
| Comparative Examples | amount of ruthenium oxide powder (wt %) | amount of lead ruthenate powder (wt %) | Content amount of glass powder (wt %) | Content amount of organic vehicle (wt %) | Content amount of niobium oxide (wt %) | Content amount of silicon oxide (wt %) | Content amount of lead oxide (wt %) | Content amount of boron oxide (wt %) | Content amount of aluminium oxide (wt %) | Content amount of zinc oxide (wt %) | Content amount of calcium oxide (wt %) |
| Comparative Example1 | 6 | 17 | 36 | 40 | 1 | 33 | 47 | 7 | 5 | 3 | 5 |

*Each of the shown content amount (wt %) of ruthenium oxide powder, lead ruthenate powder, glass powder, organic vehicle, and niobium oxide is relative to 100 wt % of the thick film resistor paste composition.
*Each of the shown content amount (wt %) of silicon oxide, lead oxide, boron oxide, aluminum oxide, zinc oxide, and calcium oxide is relative to 100 wt % of the glass components.

TABLE 3

| Embodied Examples and Comparative Examples | Converted area resistance (kiloohm) | High temperature TCR (ppm/degrees Celsius) | Evaluation of trimming property | Resistance value change rate (%) |
|---|---|---|---|---|
| Embodied Example1 | 9.9 | 38 | ○ | 0.13 |
| Embodied Example2 | 98000 | −186 | ○ | −0.9 |
| Embodied Example3 | 0.25 | 248 | ○ | −0.42 |
| Embodied Example4 | 2.2 | 89 | ○ | −0.27 |
| Embodied Example5 | 21 | 21 | ○ | −0.35 |
| Embodied Example6 | 13 | 39 | ○ | 0.1 |
| Embodied Example7 | 3 | 69 | ○ | −0.61 |
| Embodied Example8 | 14 | 20 | ○ | −0.11 |
| Embodied Example9 | 2.2 | 99 | ○ | −0.3 |
| Embodied Example10 | 16 | 13 | ○ | −0.33 |
| Embodied Example11 | 9.1 | 36 | ○ | 0.5 |
| Embodied Example12 | 9 | 42 | ○ | 0.8 |
| Comparative Example1 | 9.5 | 11 | ○ | 1.8 |
| Comparative Example2 | 10.2 | −9 | X | — |
| Comparative Example3 | >100000 | — | — | — |
| Comparative Example4 | 0.23 | 250 | ○ | 1.6 |
| Comparative Example5 | 2 | 92 | ○ | 2.2 |
| Comparative Example6 | 17 | 25 | X | — |
| Comparative Example7 | 9.8 | 45 | ○ | 1.7 |
| Comparative Example8 | 2.7 | 70 | X | — |
| Comparative Example9 | 1.8 | 105 | ○ | 2.3 |
| Comparative Example10 | 13 | 15 | X | — |

As shown in Table 3, the thick film resistors of Embodied Examples 1 to 12 were observed to have extremely low resistance value change rates before and after the electrostatic discharge tests and had excellent surge resistances, as compared with the thick film resistor of Comparative Example 1 formed by the conventional film resistor paste without using the lead-ruthenate-containing glass powder. The thick film resistors of Embodied Examples 1 to 12 were formed by the thick film resistor pastes prepared by using the lead-ruthenate-containing glass powders of the present invention.

The thick film resistors of Comparative Examples 2, 6, 8, and 10 were observed to have insufficient trimming properties and were not suitable for commercialization. The thick film resistors of Comparative Examples 2, 6, 8, and 10 were formed by the thick film resistor pastes obtained by using the lead-ruthenate-containing glasses that were prepared by using the glass components of which boron oxide content were less than the claimed range of the present invention.

Furthermore, the thick film resistor of Comparative Example 3 was observed to present almost no conductivity, because the resistance value of the lead-ruthenate-containing glass powder became too high. The thick film resistor of Comparative Examples 3 was formed by the thick film resistor paste obtained by using the lead-ruthenate-containing glass of which content of lead ruthenate was less than the claimed range of the present invention.

Furthermore, the thick film resistor of Comparative Example 4 was observed to have higher resistance value change rate before and after the electrostatic discharge test and to have lower surge resistance, as compared with the thick film resistors of Embodied Examples 1 to 12. The thick film resistor of Comparative Example 4 was formed by the thick film resistor paste obtained by using the lead-ruthenate-containing glass of which content of lead ruthenate was more than the claimed range of the present invention.

Furthermore, the thick film resistors of Comparative Examples 5 and 7 were observed to have higher resistance value change rates before and after the electrostatic discharge tests and to have lower surge resistances, as compared with the thick film resistors of Embodied Examples 1 to 12. The thick film resistors of Comparative Examples 5 and 7 were formed by the thick film resistor pastes obtained by using the glass components whose content of silicon oxide or lead oxide, or the combined amount of these essential glass components were outside the claimed range of the present invention. The thick film resistor of Comparative Example 9 was also observed to have higher resistance value change rate before and after the electrostatic discharge test and to have lower surge resistance, as compared with the thick film resistors of Embodied Examples 1 to 12. The thick film resistor of Comparative Example 9 was formed by the thick film resistor paste using the glass components of which content of boron oxide was more than the claimed range of the present invention.

From the above test results, it is recognized that the thick film resistor formed by using the thick film resistor paste of the present invention has excellent trimming property and surge resistance, and can be suitably used for electronic components which have been miniaturized in recent years.

The invention claimed is:

1. A thick film resistor paste, characterized by kneading:
   a lead-ruthenate-containing glass powder that does not contain a ruthenium oxide; and
   an organic vehicle,
   wherein the lead-ruthenate-containing glass powder comprises 10 mass % or more and 70 mass % or less of lead ruthenate relative to 100 mass % of the glass composition containing the lead ruthenate;
   wherein a glass composition of the lead-ruthenate-containing glass powder comprises 3 mass % or more and 60 mass % or less of silicon oxide, 30 mass % or more and 90 mass % or less of lead oxide, and 5 mass % or more and 50 mass % or less of boron oxide relative to 100 mass % of glass components; and
   wherein a combined amount of silicon oxide, lead oxide and boron oxide by mass % is 50 mass % or more relative to 100 mass % of the glass components.

2. The thick film resistor paste according to claim 1, wherein an average particle diameter of the lead-ruthenate-containing glass powder is 5 micrometers or less.

3. The thick film resistor comprising a sintered body of the thick film resistor paste according to claim 1.

4. An electric or electronic component provided with the thick film resistor according to claim 3.

* * * * *